(12) United States Patent
Cho et al.

(10) Patent No.: US 10,760,658 B2
(45) Date of Patent: Sep. 1, 2020

(54) POWER TRANSMISSION APPARATUS FOR A VEHICLE

(71) Applicants: Hyundai Motor Company, Seoul (KR); KIA Motors Corporation, Seoul (KR)

(72) Inventors: Wonmin Cho, Gyeonggi-do (KR); Kijong Park, Gyeonggi-do (KR); Seongwook Ji, Gyeonggi-do (KR); Ki Dong Kim, Gyeonggi-do (KR); Hyun Sik Kwon, Seoul (KR); Cheol Ho Jang, Basan (KR); Seong Wook Hwang, Gyeonggi-do (KR); Ki Tae Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 112 days.

(21) Appl. No.: 16/144,691

(22) Filed: Sep. 27, 2018

(65) Prior Publication Data

US 2020/0032886 A1 Jan. 30, 2020

(30) Foreign Application Priority Data

Jul. 24, 2018 (KR) .......................... 10-2018-0086046

(51) Int. Cl.
*F16H 3/08* (2006.01)
*F16H 37/08* (2006.01)
(Continued)

(52) U.S. Cl.
CPC ......... *F16H 37/0833* (2013.01); *B60K 6/365* (2013.01); *F16H 3/006* (2013.01);
(Continued)

(58) Field of Classification Search
CPC .. F16H 37/0833; F16H 3/006; F16H 37/0826; F16H 2200/2005; F16H 2003/445; F16H 37/046
(Continued)

(56) References Cited

U.S. PATENT DOCUMENTS 8,323,142 B2 12/2012 Masumoto
2008/0070742 A1* 3/2008 Phillips ............... F16H 37/0833
475/331
(Continued)

FOREIGN PATENT DOCUMENTS

JP 4168873 B2 10/2008

*Primary Examiner* — Roger L Pang
(74) *Attorney, Agent, or Firm* — Brinks Gilson & Lione

(57) ABSTRACT

A power transmission apparatus includes a first input shaft selectively receiving an input torque, a second input shaft coaxially disposed with the first input shaft and selectively receiving the input torque, first and second intermediate shafts selectively interconnected and disposed in parallel with the first input shaft, a torque mediating shaft coaxially disposed with the first input shaft, a preliminary shifting section receiving a torque through a first input shaft and selectively outputting a shifted torque to the second intermediate shaft, a compound shifting section including a planetary gear set having a sun gear fixedly connected with the torque mediating shaft, a planet carrier fixedly connected with the second input shaft, and a ring gear externally gear-meshed with the second intermediate shaft, and an output shaft receiving a torque received from the compound shifting section and transmitting the received torque to a differential.

7 Claims, 4 Drawing Sheets

(51) Int. Cl.
*F16H 3/00* (2006.01)
*B60K 6/365* (2007.10)
*F16H 3/44* (2006.01)
*F16H 37/04* (2006.01)

(52) U.S. Cl.
CPC ....... *F16H 37/0826* (2013.01); *F16H 37/046* (2013.01); *F16H 2003/445* (2013.01); *F16H 2200/2005* (2013.01)

(58) Field of Classification Search
USPC .................................. 475/207; 74/330, 329
See application file for complete search history.

(56) References Cited

U.S. PATENT DOCUMENTS

| | | | | |
|---|---|---|---|---|
| 2015/0285352 A1* | 10/2015 | Vollmer | ................ | F16H 3/006 475/219 |
| 2015/0285353 A1* | 10/2015 | Markl | .................... | F16H 3/006 475/219 |
| 2016/0377155 A1* | 12/2016 | Raisch | .................... | F16H 3/006 475/207 |

* cited by examiner

FIG. 2

| Shift-stage | CL1 | CL2 | CL3 |
|---|---|---|---|
| D1 | ● |   | ● |
| D2 |   | ● | ● |
| D3 | ● | ● |   |

FIG. 4

| Shift-stage | CL1 | CL2 | CL3 | SL1 | | |
| --- | --- | --- | --- | --- | --- | --- |
| | | | | DG2 | N | DG1 |
| D1 | ● | | ● | ● | | |
| D2 | ● | | ● | | | ● |
| D3 | | ● | ● | | ● | |
| D4 | ● | ● | | | | ● |
| D5 | ● | ● | | ● | | |

POWER TRANSMISSION APPARATUS FOR A VEHICLE

CROSS-REFERENCE TO RELATED APPLICATION

This application claims priority to and the benefit of Korean Patent Application No. 10-2018-0086046 filed in the Korean Intellectual Property Office on Jul. 24, 2018, the entire contents of which are incorporated herein by reference.

FIELD

The present disclosure relates to a power transmission apparatus for a vehicle.

BACKGROUND

The statements in this section merely provide background information related to the present disclosure and may not constitute prior art.

Advanced car makers have focused their energy on the development of an environmentally-friendly vehicle to achieve environmental and fuel efficiency regulations.

An electric vehicle (EV) or a hybrid electric vehicle (HEV) that utilizes electrical energy, or a double clutch transmission (DCT) improving efficiency and convenience of a transmission may be examples of such future vehicle technology.

The double clutch transmission (DCT) includes two clutches devices and a gear train of a basically manual transmission, selectively transmits a torque input from an engine to two input shafts by using the two clutches devices, and outputs a torque shifted by the gear train.

Such a double clutch transmission (DCT) attempts to compactly realize a multi-stage transmission of more than five speeds. The DCT achieves an automated manual transmission (AMT) that removes the inconvenience of a manual shifting of a driver, by controlling two clutches and synchronizing devices by a controller.

In comparison with an automatic transmission using planetary gears, we have discovered that such a DCT shows merits, such as higher efficiency in power delivery, easier modification in revising or adding parts in order to achieve more shift-stages, etc., and thus gathers more spotlight since it can more comfortably conform with fuel consumption regulation and efficiency in achieving more shift-stages.

The above information disclosed in this Background section is only for enhancement of understanding of the background of the disclosure and therefore it may contain information that does not form the prior art that is already known to a person of ordinary skill in the art.

SUMMARY

Further areas of applicability will become apparent from the description provided herein. It should be understood that the description and specific examples are intended for purposes of illustration only and are not intended to limit the scope of the present disclosure.

The present disclosure describes a power transmission apparatus for a vehicle having advantages achieving shift-stages of at least three forward speeds by employing a simple arrangement of a planetary gear set and external gear engagements to a double clutch scheme, thereby improving fuel consumption and better applicability to a hybrid vehicle.

A power transmission apparatus for a vehicle may include first and second input shafts, first and second intermediate shafts, a torque mediating shaft, a preliminary shifting section, a compound shifting section, and an output shaft. The first input shaft selectively receives an input torque through a first clutch. The second input shaft is formed as a hollow shaft, coaxially and exteriorly disposed with the first input shaft without rotational interference, and selectively receives the input torque through a second clutch. The first and second intermediate shafts are disposed along a same axis that is in parallel with the first input shaft, where the first and second intermediate shafts are selectively interconnected through a third clutch. The torque mediating shaft is formed as a hollow shaft and coaxially and exteriorly disposed with the first input shaft without rotational interference. The preliminary shifting section receives a torque through a first input shaft and selectively outputs a shifted torque to the second intermediate shaft. The compound shifting section includes a planetary gear set of which a sun gear is fixedly connected with the torque mediating shaft, a planet carrier is fixedly connected with the second input shaft, and a ring gear is externally gear-meshed with the second intermediate shaft. The output shaft is disposed in parallel with the first input shaft, receives a torque received from the compound shifting section, and transmits the received torque to a differential.

The preliminary shifting section may include a first drive gear and a first driven gear. The first drive gear may be fixedly connected with the first input shaft and the torque mediating shaft; and The first driven gear may be fixedly connected with the first intermediate shaft and externally gear-meshed with the first drive gear.

The preliminary shifting section may include a first drive gear fixedly connected with the torque mediating shaft, a first driven gear fixedly connected with the first intermediate shaft and externally gear-meshed with the first drive gear, a second drive gear rotatably disposed on the first input shaft, and a second driven gear fixedly connected with the first intermediate shaft and externally gear-meshed with the second drive gear.

The first drive gear and the second drive gear may be selectively connected with the first input shaft by a first synchronizer.

A gear ratio between the first drive gear and the first driven gear may be used for the forward second speed and the forward fourth speed. A gear ratio between the second drive gear and the second driven gear may be used for the forward first speed and the forward fifth speed.

The planetary gear set of the compound shifting section may be disposed on the first input shaft. An intermediate output gear may be integrally formed to an external circumference of the ring gear, and externally gear-meshed with an intermediate drive gear formed on the second intermediate shaft.

An output shaft driving gear may be integrally formed on the output shaft and externally gear-meshed with the intermediate output gear.

The planetary gear set may be a single pinion planetary gear set.

A power transmission apparatus for a vehicle achieves shift-stages of at least three forward speeds by employing a simple arrangement of a planetary gear set and external gear engagements to a double clutch scheme, thereby improving fuel consumption and better applicability to a hybrid vehicle.

In addition, by reducing the number of mechanical elements, the structure of a power transmission apparatus may be simplified, thereby enhancing durability, reducing a length of the apparatus, and reducing weight.

In addition, the two clutches are alternately operated in order to form odd-numbered shift-stages and even-numbered shift-stages, thereby shifting operation may become more rapid and smooth.

Further, effects that can be obtained from the present disclosure are directly or suggestively described in the following detailed description.

DRAWINGS

In order that the disclosure may be well understood, there will now be described various forms thereof, given by way of example, reference being made to the accompanying drawings, in which:

FIG. 2 is a shifting operational chart for a power transmission apparatus for a vehicle;

FIG. 4 is a shifting operational chart for a power transmission apparatus for a vehicle.

Figure 1:
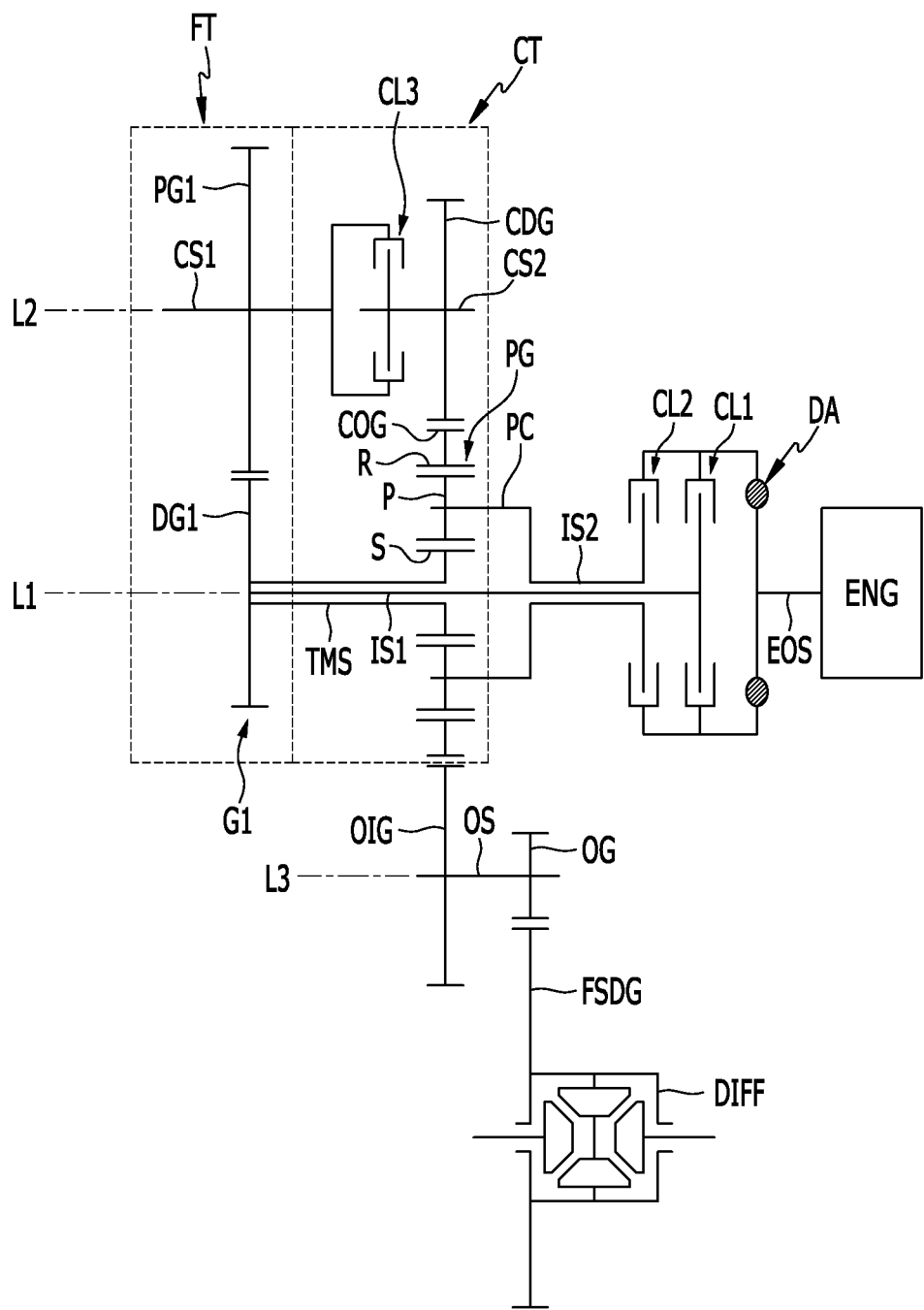
FIG. 1 is a schematic view of a power transmission apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic view of a power transmission apparatus for a vehicle according to a first aspect.

Referring to FIG. 1, a power transmission apparatus for a vehicle according to a first aspect includes first and second input shafts IS1 and IS2, first and second intermediate shafts CS1 and CS2, a torque mediating shaft TMS, a preliminary shifting section FT, a compound shifting section CT, and an output shaft OS.

A power transmission apparatus according to a first aspect realizes shift-stages of three forward speeds. A torque of an engine ENG is shifted in the preliminary shifting section FT. In the forward first speed D1, the shifted torque of the preliminary shifting section FT is output without being affected by the compound shifting section CT. In the forward second speed D2, a shifted torque is formed by cooperative operation of the preliminary shifting section FT and the compound shifting section CT. In the forward third speed D3, the torque of the engine ENG input to the compound shifting section CT is output to the output shaft OS.

The engine ENG as a power source may be realized as a various kind of typical engines such as a gasoline engine or a diesel engine that uses fossil fuel.

The torque of the engine ENG is delivered to the preliminary shifting section FT and the compound shifting section CT depending on connection of the first and second input shafts IS1 and IS2 to the engine ENG.

The preliminary shifting section FT and the compound shifting section CT are respectively disposed on first and second axes L1 and L2 disposed in parallel. The first and second input shafts IS1 and IS2 and the torque mediating shaft TMS are arranged along the first axis L1. The first and second intermediate shafts CS1 and CS2 are arranged along the second axis L2.

The output shaft OS is arranged along a third axis L3 that is disposed in parallel with the first axis L1.

The first input shaft IS1 is selectively connected with an engine output shaft EOS (crankshaft) of the engine ENG through a first clutch CL1. The first input shaft IS1 selectively receives the torque of the engine ENG and transmits the received torque to the preliminary shifting section FT.

The second input shaft IS2, being formed as a hollow shaft, is disposed coaxial with and exterior to the first input shaft IS1 without rotational interference, and selectively connected with the output shaft EOS of the engine ENG through a second clutch CL2. The second input shaft IS2 selectively receives the torque of the engine ENG and transmits the received torque to the compound shifting section CT.

The torque mediating shaft TMS is formed as a hollow shaft and is disposed coaxial with and exterior to the first input shaft IS1. The torque mediating shaft TMS interconnects the preliminary shifting section FT and the compound shifting section CT.

The first and second intermediate shafts CS1 and CS2 disposed on the same axis of the second axis L2 are selectively interconnected by a third clutch CL3.

An output shaft driving gear OIG and a final output gear OG are integrally formed on the output shaft OS disposed on the third axis L3. The final output gear OG is externally gear-meshed with the final reduction gear FSDG connected to a differential DIFF.

The preliminary shifting section FT includes a first shifting gear set G1 disposed between the first intermediate shaft CS1 and the first input shaft IS1 (equivalently, a torque mediating shaft TMS fixedly connected to the first input shaft IS1).

The first shifting gear set G1 includes a first drive gear DG1 and a first driven gear PG1. The first drive gear DG1 is fixedly connected with the first input shaft IS1 and the torque mediating shaft TMS. The first driven gear PG1 is fixedly connected with the first intermediate shaft CS1 and externally gear-meshed with the first drive gear DG1.

Such a preliminary shifting section FT including the first shifting gear set G1 may realize one speed ratio by a gear ratio between the first drive gear DG1 and the first driven gear PG1.

The gear ratio between the first drive gear DG1 and the first driven gear PG1 may be set in consideration of design factors. In the first aspect, the gear ratio of the first shifting gear set G1 is used as a gear ratio for the forward first speed.

That is, the forward first speed is realized by the first shifting gear set G1.

The torque shifted by the preliminary shifting section FT through the shifting gear set G1 is output to the compound shifting section CT through a path including the second intermediate shaft CS2.

The compound shifting section CT includes a third clutch CL3, an intermediate drive gear CDG integrally formed on the second intermediate shaft CS2, and a planetary gear set PG. The planetary gear set PG is disposed on the first axis L1 between the engine ENG and the preliminary shifting section FT.

The third clutch CL3 selectively connects the first intermediate shaft CS1 and the second intermediate shaft CS2 such that the first and second intermediate shafts CS1 and CS2 may integrally rotate.

The planetary gear set PG is a single pinion planetary gear set, and includes a sun gear S, a planet carrier PC rotatably supporting a plurality of pinion gears P externally gear-meshed with the sun gear S, and a ring gear R internally gear-meshed with the plurality of pinion gears P.

The sun gear S is fixedly connected with the torque mediating shaft TMS. The planet carrier PC is fixedly connected with the second input shaft IS2. The ring gear R acts as an output element, and an intermediate output gear COG is integrally formed at an external circumference of the ring gear R.

The intermediate output gear COG is externally gear-meshed with the intermediate drive gear CDG, and externally gear-meshed with the output shaft driving gear OIG of the output shaft OS.

By such an arrangement, the compound shifting section CT may transmit the torque received at the intermediate output gear COG from the intermediate drive gear CDG of the second intermediate shaft CS2 to the output shaft driving gear OIG without any change.

In a state that a torque is not input to the compound shifting section CT from the preliminary shifting section FT, when the third clutch CL3 is operated while the torque of the engine ENG is input to the planet carrier PC by the operation of the second clutch CL2, the planetary gear set PG, the first shifting gear set G1, and the first and second intermediate shafts CS1 and CS2 form a closed power delivery path. Then, a shifting operation may be realized by cooperative operation of the preliminary shifting section FT and the compound shifting section CT forming a shift-ratio by combination of the gear ratio of the first shifting gear set G1 and the gear ratio between the intermediate drive gear CDG and the intermediate output gear COG.

The engagement elements of the first, second, and third clutches CL1, CL2, and CL3 may be realized as multi-plate hydraulic pressure friction devices that are frictionally engaged by hydraulic pressure, however, it should not be understood to be limited thereto, since various other configuration that are electrically controllable may be available.

The reference symbol DA indicates a damper employed to absorb a torque variation of the engine ENG.

Figure 2:
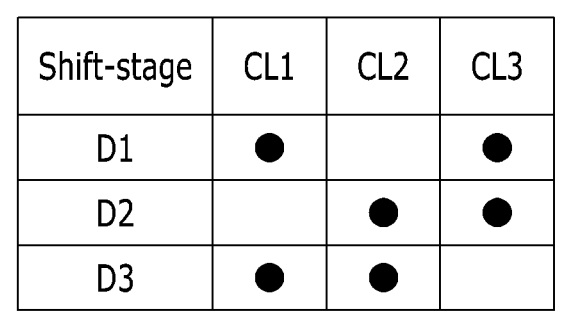

FIG. 2 is a shifting operational chart for a power transmission apparatus for a vehicle according to a first aspect of the present disclosure, and the power transmission apparatus for a vehicle according to a first aspect performs shifting operation as follows.

[The Forward First Speed]

As shown in FIG. 2, the first clutch CL1 and the third clutch CL3 are operated in the forward first speed D1.

Then, by the operation of the first and third clutches CL1 and CL3, the torque of the engine ENG is transmitted through the first clutch CL1, the first input shaft IS1, the first drive gear DG1, the first driven gear PG1, the first intermediate shaft CS1, the third clutch CL3, the second intermediate shaft CS2, the intermediate drive gear CDG, the intermediate output gear COG, the output shaft driving gear OIG, the output shaft OS, and the final output gear OG, thereby realizing the forward first speed and outputting a shifted torque to the final reduction gear FSDG and the differential DIFF.

In this case, the compound shifting section CT does not affect shifting for the first speed.

[The Forward Second Speed]

As shown in FIG. 2, the second clutch CL2 and the third clutch CL3 are operated in the forward second speed D2.

The torque of the engine is input to the planet carrier PC by the operation of the second clutch CL2. In this state, the first and second intermediate shafts CS1 and CS2 are interconnected by the operation of the third clutch CL3.

Then, the planetary gear set PG, the first shifting gear set G1, and the first and second intermediate shafts CS1 and CS2 form a closed power delivery path. In this state, the torque of the engine ENG is input to the planet carrier PC of the planetary gear set PG. Then, the forward second speed is realized by cooperative operation of the preliminary shifting section FT and the compound shifting section CT forming a shift-ratio by combination of the gear ratio of the first shifting gear set G1 and the gear ratio between the intermediate drive gear CDG and the intermediate output gear COG. A shifted torque is transmitted, through the intermediate output gear COG, the output shaft driving gear OIG, the output shaft OS, and the final output gear OG, to the final reduction gear FSDG and the differential DIFF.

[The Forward Third Speed]

As shown in FIG. 2, the first clutch CL1 and the second clutch CL2 are operated in the forward third speed D3.

Then, by the operation of the first clutch CL1, the torque of the engine ENG is partially input to the sun gear S of the compound shifting section CT through the first clutch CL1, the first input shaft IS1, the first drive gear DG1, and the torque mediating shaft TMS. In addition, by the operation of the second clutch CL2, the torque of the engine ENG is partially input to the planet carrier PC of the compound shifting section CT.

Then, by receiving the same rotation speed through the sun gear S and the planet carrier PC, the planetary gear set PG of the compound shifting section CT integrally rotates and outputs the same rotation speed to the ring gear R, thereby realizing the forward third speed and outputting a shifted torque, through the intermediate output gear COG, the output shaft driving gear OIG, the output shaft OS, the final output gear OG, to the final reduction gear FSDG and the differential DIFF.

Figure 3:
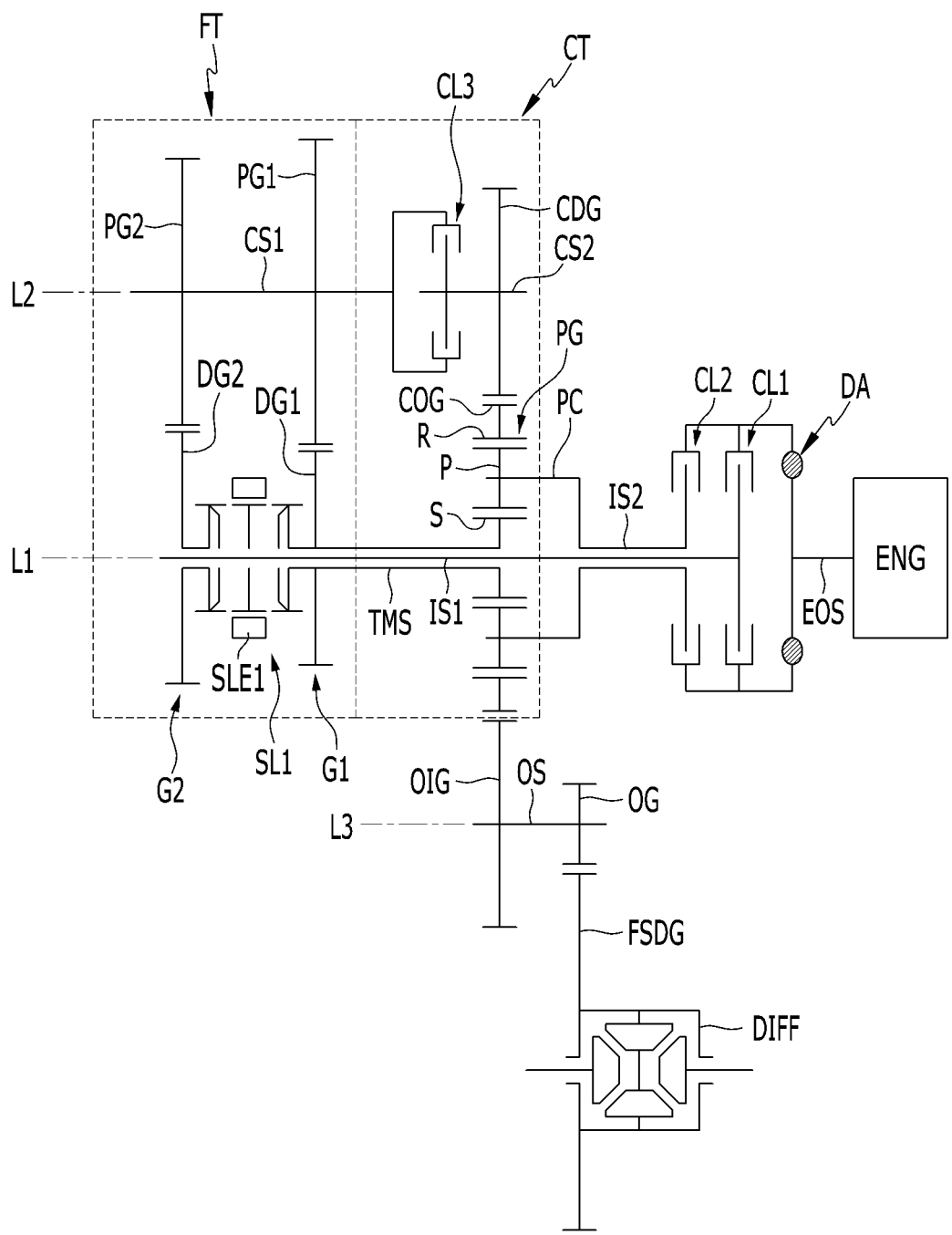
FIG. 3 is a schematic view of a power transmission apparatus for a vehicle.

FIG. 3 is a schematic view of a power transmission apparatus for a vehicle according to a second aspect.

Referring to FIG. 3, in comparison with the first aspect, a power transmission apparatus according to the second aspect includes first and second shifting gear sets G1 and G2 in the preliminary shifting section FT. The first and second shifting gear sets G1 and G2 are selectively engaged with the first input shaft IS1 by a synchronizer SL1.

That is, the preliminary shifting section FT of the second aspect further employs the second shifting gear set G2 and a synchronizer SL1 to selectively engage either of the first and second shifting gear sets G1 and G2 with the first input shaft IS1, thereby enabling two different shift-stages in the preliminary shifting section FT.

The first shifting gear set G1 includes a first drive gear DG1 and a first driven gear PG1. The first drive gear DG1 is fixedly connected with the torque mediating shaft TMS. The first driven gear PG1 is fixedly connected with the first intermediate shaft CS1 and externally gear-meshed with the first drive gear DG1.

The second shifting gear set G2 includes a second drive gear DG2 and a second driven gear PG2. The second drive gear DG2 is rotatably disposed on the first input shaft IS1. The second driven gear PG2 is fixedly connected with the first intermediate shaft CS1 and externally gear-meshed with the second drive gear DG2.

The first synchronizer SL1 is dispose on the first input shaft IS1 at a location between the first and second drive gears DG1 and DG2, and enables selective engagement of either of the first and second drive gears DG1 and DG2.

The first synchronizer SL1 may be formed as known in the art including a first sleeve SLE1 that is actuated by an actuator (not shown) controlled by an electronic control unit such as a typical transmission control unit.

The gear ratio between the first drive gear DG1 and the first driven gear PG1 and between the second drive gear DG2 and the second driven gear PG2 may be set in consideration of design factors. In the second aspect, the gear ratio of the first shifting gear set G1 is used as a gear ratio for the forward second speed, and the gear ratio of the second shifting gear set G2 is used as a gear ratio for the forward first and fifth speeds.

That is, the first and second shifting gear sets G1 and G2 relates to realizing the forward first, second, fourth, and fifth speeds.

FIG. 4 is a shifting operational chart for a power transmission apparatus for a vehicle according to a second aspect, and the power transmission apparatus for a vehicle performs shifting operation as follows.

[The Forward First Speed]

As shown in FIG. 4, in the forward first speed D1, the second drive gear DG2 and the first input shaft IS1 are interconnected by operating the sleeve SEL1 of the first synchronizer SL1, and the first clutch CL1 and the third clutch CL3 are operated.

Then, by the operation of the first and third clutches CL1 and CL3, the torque of the engine ENG is transmitted through the first clutch CL1, the first input shaft IS1, the second drive gear DG2, the second driven gear PG2, the first intermediate shaft CS1, the third clutch CL3, the second intermediate shaft CS2, the intermediate drive gear CDG, the intermediate output gear COG, the output shaft driving gear OIG, the output shaft OS, and the final output gear OG, thereby outputting a shifted torque to the final reduction gear FSDG and the differential DIFF thereby realizing the forward first speed.

In this case, the compound shifting section CT does not affect shifting for the first speed.

[The Forward Second Speed]

As shown in FIG. 4, in the forward second speed D2, the first drive gear DG1 and the first input shaft IS1 are interconnected by operating the sleeve SEL1 of the first synchronizer SL1, and the first clutch CL1 and the third clutch CL3 are operated.

Then, by the operation of the first and third clutches CL1 and CL3, the torque of the engine ENG is transmitted through the first clutch CL1, the first input shaft IS1, the first drive gear DG1, the first driven gear PG1, the first intermediate shaft CS1, the third clutch CL3, the second intermediate shaft CS2, the intermediate drive gear CDG, the intermediate output gear COG, the output shaft driving gear OIG, the output shaft OS, and the final output gear OG, thereby realizing the forward second speed and outputting a shifted torque to the final reduction gear FSDG and the differential DIFF.

The compound shifting section CT does not affect forming the forward first speed.

[The Forward Third Speed]

As shown in FIG. 4, in the forward third speed D3, the second clutch CL2 and the third clutch CL3 are operated while the first synchronizer SL1 is in a neutral position.

Then, the torque of the engine ENG is input to the planet carrier PC by the operation of the second clutch CL2, and the first and second intermediate shafts CS1 and CS2 are interconnected by the operation of the third clutch CL3.

Then, the planetary gear set PG, the first shifting gear set G1, and the first and second intermediate shafts CS1 and CS2 form a closed power delivery path. In this state, the torque of the engine ENG is input to the planet carrier PC of the planetary gear set PG. Then, the forward second speed is realized by cooperative operation of the preliminary shifting section FT and the compound shifting section CT forming a shift-ratio by combination of the gear ratio of the first shifting gear set G1 and the gear ratio between the intermediate drive gear CDG and the intermediate output gear COG. A shifted torque is transmitted, through the intermediate output gear COG, the output shaft driving gear OIG, the output shaft OS, and the final output gear OG, to the final reduction gear FSDG and the differential DIFF.

[The Forward Fourth Speed]

As shown in FIG. 4, in the forward fourth speed D4, the first drive gear DG1 and the first input shaft IS1 are interconnected by operating the sleeve SEL1 of the first synchronizer SL1, and the first clutch CL1 and the second clutch CL2 are operated.

Then, by the operation of the first clutch CL1, the torque of the engine ENG is partially input to the sun gear S of the compound shifting section CT through the first clutch CL1, the first input shaft IS1, the first drive gear DG1, and the torque mediating shaft TMS. In addition, by the operation of the second clutch CL2, the torque of the engine ENG is partially input to the planet carrier PC of the compound shifting section CT.

Then, by receiving the same rotation speed through the sun gear S and the planet carrier PC, the planetary gear set PG of the compound shifting section CT integrally rotates and outputs the same rotation speed to the ring gear R, thereby realizing the forward third speed and outputting a shifted torque, through the intermediate output gear COG, the output shaft driving gear OIG, the output shaft OS, the final output gear OG, to the final reduction gear FSDG and the differential DIFF.

[The Forward Fifth Speed]

As shown in FIG. 4, in the forward fifth speed D5, the second drive gear DG2 and the first input shaft IS1 are interconnected by operating the sleeve SEL1 of the first synchronizer SL1, and the first clutch CL1 and the second clutch CL2 are operated.

Then, by the operation of the first clutch CL1, the torque of the engine ENG is partially input to the sun gear S of the compound shifting section CT through the first clutch CL1, the first input shaft IS1, the second drive gear DG2, the second driven gear PG2, the first intermediate shaft CS1, the first driven gear PG1, the first drive gear DG1, and the torque mediating shaft TMS. In addition, by the operation of the second clutch CL2, the torque of the engine ENG is partially input to the planet carrier PC of the compound shifting section CT.

Then, by receiving different rotation speed through the sun gear S and the planet carrier PC, the planetary gear set PG of the compound shifting section CT functions to output a shifted speed through the ring gear R, thereby realizing the forward fifth speed and outputting a shifted torque, through the intermediate output gear COG, the output shaft driving gear OIG, the output shaft OS, the final output gear OG, to the final reduction gear FSDG and the differential DIFF.

As described above, a power transmission apparatus for a vehicle according to one form of the present disclosure achieves shift-stages of at least three forward speeds by employing a simple arrangement of a planetary gear set and external gear engagements to a double clutch scheme, thereby improving fuel consumption and better applicability to a hybrid vehicle.

In addition, by reducing the number of mechanical elements, the structure of a power transmission apparatus may be simplified, thereby enhancing durability, reducing a length of the apparatus, and reducing weight.

In addition, the two clutches are alternately operated in order to form odd-numbered shift-stages and even-numbered shift-stages, thereby shifting operation may become more rapid and smooth.

It is to be understood that the present aspects are not limited to the disclosed forms, but, on the contrary, are intended to cover various modifications and equivalent arrangements included within the spirit and scope of the appended claims.

DESCRIPTION OF SYMBOLS

CDG: intermediate drive gear
CL1, CL2, CL3: first, second, and third clutches
COG: intermediate output gear
CS1, CS2: first and second intermediate shafts
CT: compound shifting section
DG1, DG2: first and second drive gears
FT: preliminary shifting section
G1, G2: first and second shifting gear sets
EOS: engine output shaft (crankshaft)
IS1, IS2: first and second input shafts
OG: final output gear
OIG: output shaft driving gear
OS: output shaft
PG1, PG2: first and second driven gears
PG: planetary gear set
SL1: first synchronizer
TMS: torque mediating shaft

What is claimed is:

1. A power transmission apparatus for a vehicle, comprising:
   a first input shaft for selectively receiving an input torque through a first clutch;
   a second input shaft formed as a hollow shaft, coaxially and exteriorly disposed with the first input shaft without rotational interference, and selectively receiving the input torque through a second clutch;
   first and second intermediate shafts disposed along a same axis that is in parallel with the first input shaft, the first and second intermediate shafts being selectively interconnected through a third clutch;
   a torque mediating shaft formed as a hollow shaft and coaxially and exteriorly disposed with the first input shaft;
   a preliminary shifting section receiving a torque through the first input shaft and selectively outputting a shifted torque to the first intermediate shaft;
   a compound shifting section including a planetary gear set of which a sun gear is fixedly connected with the torque mediating shaft, a planet carrier is fixedly connected with the second input shaft, and a ring gear is externally gear-meshed with the second intermediate shaft; and
   an output shaft disposed in parallel with the first input shaft, receiving a torque received from the compound shifting section, and transmitting the received torque to a differential,
   wherein the preliminary shifting section comprises:
      a first drive gear fixedly connected with the first input shaft and the torque mediating shaft; and
      a first driven gear fixedly connected with the first intermediate shaft and externally gear-meshed with the first drive gear.

2. The power transmission apparatus of claim 1, wherein:
   the planetary gear set of the compound shifting section is disposed on the first input shaft; and
   an intermediate output gear is integrally formed to an external circumference of the ring gear, and externally gear-meshed with an intermediate drive gear formed on the second intermediate shaft.

3. The power transmission apparatus of claim 2, wherein an output shaft driving gear is integrally formed on the output shaft and externally gear-meshed with the intermediate output gear.

4. The power transmission apparatus of claim 1, wherein the planetary gear set is a single pinion planetary gear set.

5. A power transmission apparatus for a vehicle, comprising:
   a first input shaft for selectively receiving an input torque through a first clutch;
   a second input shaft formed as a hollow shaft, coaxially and exteriorly disposed with the first input shaft without rotational interference, and selectively receiving the input torque through a second clutch;
   first and second intermediate shafts disposed along a same axis that is in parallel with the first input shaft, the first and second intermediate shafts being selectively interconnected through a third clutch;
   a torque mediating shaft formed as a hollow shaft and coaxially and exteriorly disposed with the first input shaft;
   a preliminary shifting section receiving a torque through the first input shaft and selectively outputting a shifted torque to the first intermediate shaft;
   a compound shifting section including a planetary gear set of which a sun gear is fixedly connected with the torque mediating shaft, a planet carrier is fixedly connected with the second input shaft, and a ring gear is externally gear-meshed with the second intermediate shaft; and
   an output shaft disposed in parallel with the first input shaft, receiving a torque received from the compound shifting section, and transmitting the received torque to a differential,
   wherein the preliminary shifting section comprises:
      a first drive gear fixedly connected with the torque mediating shaft;
      a first driven gear fixedly connected with the first intermediate shaft and externally gear-meshed with the first drive gear;
      a second drive gear rotatably disposed on the first input shaft; and
      a second driven gear fixedly connected with the first intermediate shaft and externally gear-meshed with the second drive gear.

6. The power transmission apparatus of claim 5, wherein the first drive gear and the second drive gear are selectively connected with the first input shaft by a first synchronizer.

7. The power transmission apparatus of claim 5, wherein:
a gear ratio between the first drive gear and the first driven gear is used for a forward second speed and a forward fourth speed; and
a gear ratio between the second drive gear and the second driven gear is used for a forward first speed and a forward fifth speed.

* * * * *